Figure 1:
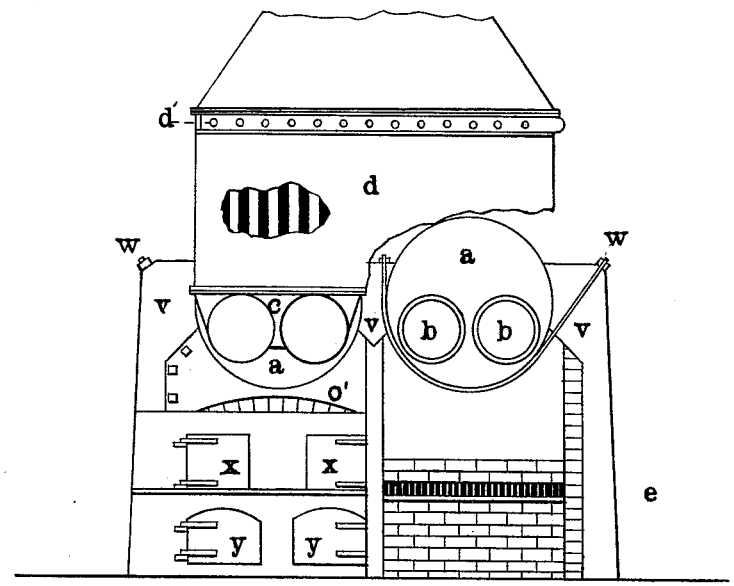

(No Model.)

J. G. McCORMICK.
Reverberatory Furnace.

No. 234,194. Patented Nov. 9, 1880.

WITNESSES:
Jos Meyrick Jr.
Thomas Ferguson.

INVENTOR.
John G. McCormick
PER. W. X. Stevens.
ATTY.

UNITED STATES PATENT OFFICE.

JOHN G. McCORMICK, OF LOUISVILLE, KENTUCKY.

REVERBERATORY FURNACE.

SPECIFICATION forming part of Letters Patent No. 234,194, dated November 9, 1880.

Application filed April 17, 1880. (No model.)

*To all whom it may concern:*

Be it known that I, JOHN G. McCORMICK, of Louisville, Kentucky, have invented a new and Improved Reverberatory Furnace, of which the following is a specification.

My invention relates to improvements in reverberatory furnaces for burning coal-slack, sawdust, and other waste products in a finely-comminuted condition, and has for its object, first, to produce perfect combustion of fuel in a boiler-furnace by procuring and maintaining a high degree of heat in the combustion-chamber, which I accomplish by means of a reverberatory furnace of relatively small dimensions, automatically and continuously fed with fine fuel without allowing cold air to enter, and with heated air enough to supply oxygen and a medium for the requisite circulation of heat; second, to provide means for heating air and for delivering it in the furnace in any desired quantity; third, to provide means for mechanically stoking or feeding the furnace with fine fuel continuously without allowing cold air to enter the furnace.

In the sense here used, a reverberatory furnace is one having side walls and an arched roof inclosing the combustion-chamber, from which the heat produced passes back under and around the boiler. This is not the most common form of boiler-furnaces. Boilers are usually placed directly over the fire, forming the roof of the furnace.

Whenever the reverberatory furnace has been used for boiler-heating, it has been made relatively very large, to serve as a sort of drying-room, into which a large mass of damp fuel—such as tan-bark, bagasse, &c.—is thrown to gradually dry and finally ignite.

In using a reverberatory furnace my plan is the reverse to the above. I require the fuel to be scattered in continually and so loosely as to ignite immediately on entering the furnace; and I make the furnace small compared with those used for burning coarse bulky fuel, in order that the walls and roof may become so heated that a high temperature, nearly corresponding to the flashing-point of the fuel used, may be maintained in the combustion-chamber. To assist in maintaining this degree of heat I find three other conditions necessary: First, finely-pulverized fuel must be mechanically introduced into the furnace in a quantity and at a rate of speed to be controlled at pleasure without admitting a draft of cold air; second, a sufficient quantity of air to furnish a circulating medium for the heat and oxygen for combustion must be furnished to the furnace, already heated as highly as it can be economically; third, the heated air must be forced into the furnace by such mechanism that the rate of delivery may be at all times controlled.

There are in common use nearly all the elemental parts which my invention combines; yet I will proceed to describe such a combination by means of the accompanying drawings.

Figure 2:
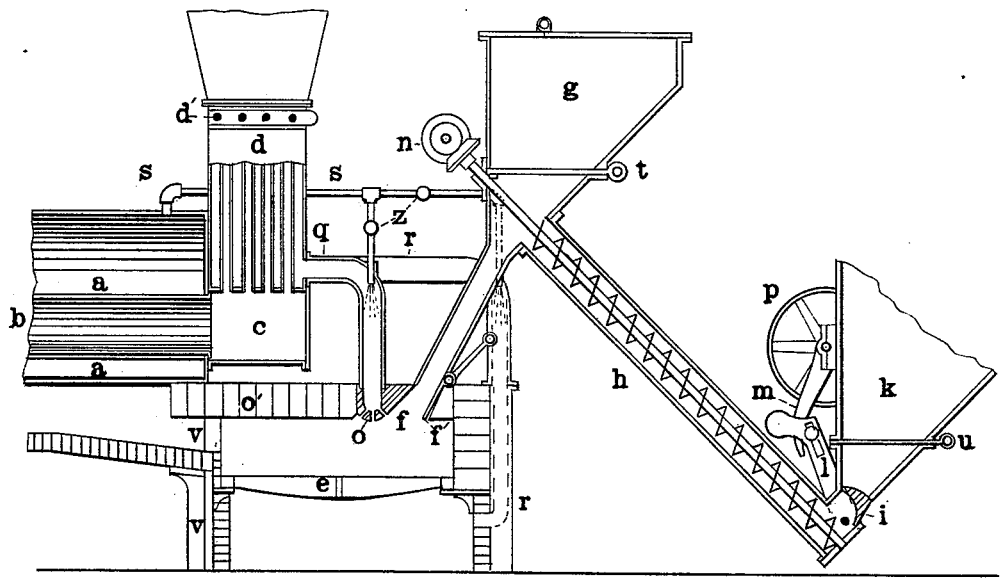

Figure 1 is a front elevation, part in section, not showing the feeding apparatus; and Fig. 2 is a longitudinal vertical section.

$a$ represents the boiler, supported by U-shaped hanging bolts $w$, Fig. 1, said bolts passing down through the capped tops of front and rear iron posts, $v$, on one side of the boiler, beneath the boiler, and up through similar posts $v$ on the other side of the boiler, and tightly drawn by screw-nuts on their ends $w$, which not only supports the boiler upon the posts $v$, but hugs said posts firmly against the boiler. The boiler and posts so fixed will stand alone without the aid of walls, so that the walls will not endanger the boiler-setting when expanded by heat.

$k$ is an open hopper, into which the fuel is usually thrown in bulk, falling upon the oscillating valve $i$, which is pivoted to swing across the vent of said hopper by means of its arm $l$, in which is a pin, struck by the wiper $m$ at each revolution of the pulley $p$, to which said wiper is attached. Said pin is made adjustable radially upon the arm $l$, so that the amount of swing of the valve $i$ may be regulated to discharge any desired quantity of fuel at each revolution of the pulley $p$, and said pulley may be caused to revolve at any desired speed, to regulate the quantity of fuel delivered to the furnace in a given time.

The fuel is carried from the vent at $i$ up a trough, $h$, to a spout, $f$, by any suitable mechanism, such as a chain of buckets, or, as here shown, by a screw caused to revolve by the beveled gears $n$.

In the vent of the spout $f$ is a deflecting-plate, $f'$, which may be set by means of its exterior handle to partially intercept the course of direct fall of the fuel through the spout $f$, causing the fuel to scatter over the grate $e$. The fuel is introduced into the furnace by this circuitous route from the point $i$, which is below the level of the grate, for the purpose of preventing ingress of cold air to the furnace while stoking, as it is intended to be a continuous process.

Air is supplied to the furnace only in such quantity as is necessary for perfect combustion and circulation by means of a tuyere, $o$, made of fire-brick, extending across the top of the furnace, following its arch, and having many openings from its inner chamber to distribute air over the top of the fuel, the air being received from a pipe, $q$, communicating with the transmission-chamber $d$ in the uptake or smoke-pipe. This chamber is traversed vertically by many small pipes, which carry the smoke from the chamber $c$ up the chimney, and in so doing they extract a great deal of heat from the volume otherwise wasted, and transmit it to the air which surrounds said pipes in the transmission-chamber. This heated air may be caused to flow through the pipe $q$ and tuyere $o$ into the furnace by any usual device, such as a blower, or, as here shown, a jet of steam from the boiler through pipe $s$, its force being regulated by the stop-cock $z$.

$r$ is another pipe, conveying air below the grate $e$, operating in a similar manner to the pipe $q$, but used either with or without a distributing-tuyere at its vent.

Air is supplied to the transmission-chamber $d$ through many small holes, $d'$, around its top, and the amount allowed to enter may be regulated by lids sliding across said holes $d'$.

The boiler, as shown, is so suspended that the heat passes to its rear end, under it, and along its sides up to low-water line, thence forward through the flues $b$ to the chamber $c$, where the air, being separated into many small streams, yields much of its heat to prepare fresh oxygen for instantaneous combustion.

In the hopper $k$ is a slide, $u$, to shut off the supply of fuel.

The hopper $g$ is for use in case it should be desirable to stoke by hand. A charge being shoveled into said hopper $g$, its top lid is closed to exclude cold air, and the slide $t$ is drawn to let in the charge.

The furnace is supplied with the usual front doors, $x$ and $y$, for cleaning purposes, or to use in case of emergency to stoke in the old way.

By supplying the furnace with a continuous stream of fine fuel, and by meeting the fuel with the requisite amount of ready-heated air, and by keeping the furnace shut while stoking, thus avoiding the retarding effect of cold air both in the fire and upon the boiler, combustion takes place so rapidly that no carbon is allowed to pass off in the form of smoke, less fuel is required to do the same amount of work, thus utilizing a larger percentage of the fuel, besides the fact of doing as much or more work with what is now nearly a waste product than is done with an equal weight of expensive fuel.

In this invention I have been guided by the theory that perfect combustion means instantaneous combustion of all that is combustible in the fuel used. By the words "instantaneous combustion" I mean flashing into flame when thrown loosely into the heated furnace, knowing that in practice there will be lumps among my fine fuel that will land upon the grate and burn more slowly.

The advantage of my invention will be apparent when it is remembered that there are thousands of tons of coal-slack and sawdust gathered in vast heaps, which are less than worthless, requiring cost to throw them away; that this fine coal is in the best possible condition for my use, being worth more to me than expensive lump-coal.

By the old process of opening doors and throwing in large quantities of coarse fuel at a time, drafts of cold air enter and cool the fire and boiler and walls, causing sudden contraction, and a great deal of heat is wasted in raising this coarse fuel to the point of combustion. Then when the mass of fuel is fully ignited the heat is so intense as to overexpand the boiler and its setting. Thus the old process is one of great waste in fuel, rapid destruction to machinery, and endangers life.

My process tends to overcome these difficulties. I gradually raise my furnace to a degree of heat high enough to produce instantaneous combustion of fine fuel, and yet not so high as the extreme heat of the old process, and I maintain that temperature as long as the furnace is in use, thus holding the boiler at a fair tension, all the time alike. The saving of property and of life that will result from this plan of heating boilers is of incalculable importance.

I am aware that reverberatory furnaces have been used for heating boilers; that heated air has been forced into some kinds of furnaces; that fine fuel has been used in certain ways; but I am not aware that all these features, which I consider essential to my invention, have ever before been used in one combination. Therefore,

I claim as my invention and wish to secure by Letters Patent—

1. A reverberatory furnace, arranged as described in respect to a boiler, in combination with an automatic device for stoking the furnace with fine fuel, a superheater for heating the air to be used by the furnace, and a device for forcing the heated air into the furnace, all as and for the purpose specified.

2. The arrangement, substantially herein described, of the heat-transmitting chamber, traversed by many small flues serving as an uptake, the heat-conducting pipes $q$ and $r$, the steam-jet pipe $s$ and stop-cock $z$, and the tuyere $o$, in combination with a reverberatory furnace.

3. A fuel-feeding device for a boiler-furnace, consisting of a supply-hopper, $k$, valve $i$, lever and adjustable pin $l$, and revolving wiper $m$, as and for the purpose specified.

JOHN G. McCORMICK.

Witnesses:
W. X. STEVENS,
M. WOODS FERGUSON.